(12) United States Patent
Yamashita

(10) Patent No.: US 8,875,820 B2
(45) Date of Patent: Nov. 4, 2014

(54) HYBRID CONSTRUCTION MACHINE
(75) Inventor: Koji Yamashita, Hiroshima (JP)
(73) Assignee: Kobelco Construction Machinery Co., Ltd., Hiroshima-shi (JP)
( * ) Notice: Subject to any disclaimer, the term of this patent is extended or adjusted under 35 U.S.C. 154(b) by 0 days.
(21) Appl. No.: 13/980,205
(22) PCT Filed: Jan. 16, 2012
(86) PCT No.: PCT/JP2012/000202
§ 371 (c)(1), (2), (4) Date: Jul. 17, 2013
(87) PCT Pub. No.: WO2012/101974
PCT Pub. Date: Aug. 2, 2012
(65) Prior Publication Data
US 2013/0299256 A1 Nov. 14, 2013
(30) Foreign Application Priority Data
Jan. 26, 2011 (JP) ................... 2011-013918
(51) Int. Cl.
*E02F 9/00* (2006.01)
*B60K 11/00* (2006.01)
*F01P 7/16* (2006.01)
*E02F 9/22* (2006.01)
*E02F 9/20* (2006.01)
*E02F 9/08* (2006.01)
*E02F 9/12* (2006.01)
(52) U.S. Cl.
CPC ............ *E02F 9/20* (2013.01); *F01P 2025/32* (2013.01); *B60K 11/00* (2013.01); *F01P 7/165* (2013.01); *F01P 2050/24* (2013.01); *E02F 9/226* (2013.01); *E02F 9/2095* (2013.01); *E02F 9/2075* (2013.01); *E02F 9/2091* (2013.01); *E02F 9/0866* (2013.01); *E02F 9/123* (2013.01); *Y10S 903/903* (2013.01)
USPC ................ 180/65.265; 180/65.27; 180/65.21; 165/42; 165/104.33; 903/903
(58) Field of Classification Search
CPC .......... B60K 11/00; B60K 11/02; B60K 6/40; B60K 2001/008; B60K 2001/003; B60K 2001/005; B60K 2001/006; E02F 9/00; E02F 9/866; F01P 2050/24; F01P 5/10; F01P 7/14; F01P 7/165; F01P 7/162; F01P 7/16; F01P 3/12; F01P 3/20; B60L 11/187; B60L 11/1874; B60L 11/1875; H01M 10/50; H01M 10/5004; H01M 10/5006; H01M 10/5016; H01M 10/507; H01M 10/5093; H01M 10/5095; H01M 10/5097
USPC .......... 180/65.265, 65.27, 65.29, 68.5, 65.21; 165/41–43, 202, 266, 287, 294, 296, 165/104.33; 310/54; 903/903; 60/685, 272; 701/22, 50; 123/41.09, 41.31
See application file for complete search history.

(56) References Cited

U.S. PATENT DOCUMENTS 2,440,369 A * 4/1948 Furman .................. 123/142.5 E
5,251,588 A * 10/1993 Tsujii et al. ............ 123/142.5 R
(Continued)

FOREIGN PATENT DOCUMENTS

DE 10220775 A1 * 11/2003 ............ H01M 10/50
JP 11022466 A * 1/1999 ................ F01P 7/16
(Continued)

OTHER PUBLICATIONS

International Search Report Issued Apr. 17, 2012 in PCT/JP12/000202 filed Jan. 16, 2012.

*Primary Examiner* — J. Allen Shriver, II
*Assistant Examiner* — Steve Clemmons
(74) *Attorney, Agent, or Firm* — Oblon, Spivak, McClelland, Maier & Neustadt, L.L.P.

(57) ABSTRACT

A hybrid construction machine includes: an electric storage device temperature adjustment circuit; an engine cooling circuit including a first coolant and switchable between a state the first coolant after cooling the engine is introduced into the electric storage device temperature adjustment circuit and a state stopping introduction of the first coolant into the electric storage device temperature adjustment circuit; an equipment cooling circuit that cools, with a second coolant, equipment needing cooling, and switchable between a state the second coolant is introduced into the electric storage device temperature adjustment circuit and a state stopping introduction of the second coolant into the electric storage device temperature adjustment circuit; and a controller controlling the engine cooling circuit, the equipment cooling circuit, and a lead-out switching valve such that the first coolant or second coolant selectively flows, according to whether the electric storage device needs to be warmed or cooled.

9 Claims, 7 Drawing Sheets

(56) References Cited

U.S. PATENT DOCUMENTS

| | | | |
|---|---|---|---|
| 5,291,960 A * | 3/1994 | Brandenburg et al. | 180/65.27 |
| 5,834,132 A * | 11/1998 | Hasegawa et al. | 429/62 |
| 6,148,910 A * | 11/2000 | Warner | 165/297 |
| 6,321,697 B1 * | 11/2001 | Matsuda et al. | 123/41.29 |
| 6,357,541 B1 * | 3/2002 | Matsuda et al. | 180/68.2 |
| 6,394,210 B2 * | 5/2002 | Matsuda et al. | 180/68.1 |
| 6,575,258 B1 * | 6/2003 | Clemmer | 180/68.5 |
| 7,451,808 B2 * | 11/2008 | Busse et al. | 165/202 |
| 8,555,826 B2 * | 10/2013 | Feldhaus et al. | 123/41.8 |
| 2001/0040061 A1 * | 11/2001 | Matuda et al. | 180/68.2 |
| 2002/0073726 A1 * | 6/2002 | Hasebe et al. | 62/323.1 |
| 2004/0069546 A1 * | 4/2004 | Lou et al. | 180/65.2 |
| 2006/0060340 A1 * | 3/2006 | Busse et al. | 165/202 |
| 2006/0284601 A1 * | 12/2006 | Salasoo et al. | 320/150 |
| 2008/0202741 A1 * | 8/2008 | Lee et al. | 165/288 |
| 2009/0068547 A1 * | 3/2009 | Ambrosio et al. | 429/50 |
| 2009/0199553 A1 | 8/2009 | Nishimura et al. | |
| 2010/0161166 A1 * | 6/2010 | Yamada et al. | 701/22 |
| 2011/0232890 A9 * | 9/2011 | Gering et al. | 165/202 |
| 2012/0130576 A1 * | 5/2012 | Sugiyama et al. | 701/22 |
| 2012/0152186 A1 * | 6/2012 | Sujan et al. | 123/41.09 |

FOREIGN PATENT DOCUMENTS

| | | | |
|---|---|---|---|
| JP | 2000274240 A * | 10/2000 | F01P 3/20 |
| JP | 2004 169464 | 6/2004 | |
| JP | 2010 127271 | 6/2010 | |
| JP | 2010168825 A * | 8/2010 | |
| WO | 2008 015798 | 2/2008 | |

* cited by examiner

FIG.3

|  | PROCESSING I | PROCESSING II | PROCESSING III |
|---|---|---|---|
| WARM-UP SWITCHING VALVE 18 | B | A | B |
| LEAD-OUT SWITCHING VALVE 19 | C | D | C |
| COOLING PUMP 14 | ON | OFF | OFF |
| FLOW CHANNEL 1 | ○ | × | ○ |
| FLOW CHANNEL 2 | ○ | × | × |
| FLOW CHANNEL 3 | × | ○ | × |

FIG.6

|  | PROCESSING X1 | PROCESSING X2 | PROCESSING X3 | PROCESSING X4 | PROCESSING X5 |
|---|---|---|---|---|---|
| WARM-UP SWITCHING VALVE 18 | B | A | A | B | B |
| LEAD-OUT SWITCHING VALVE 19 | C | D | D | C | C |
| COOLING SWITCHING VALVE 23 | E | F | F | F | F |
| COOLING PUMP 14 | ON | ON | OFF | ON | OFF |
| FLOW CHANNEL 1 | ○ | × | × | ○ | ○ |
| FLOW CHANNEL 2 | ○ | × | × | × | × |
| FLOW CHANNEL 2S | × | ○ | × | ○ | × |
| FLOW CHANNEL 3 | × | ○ | ○ | × | × |

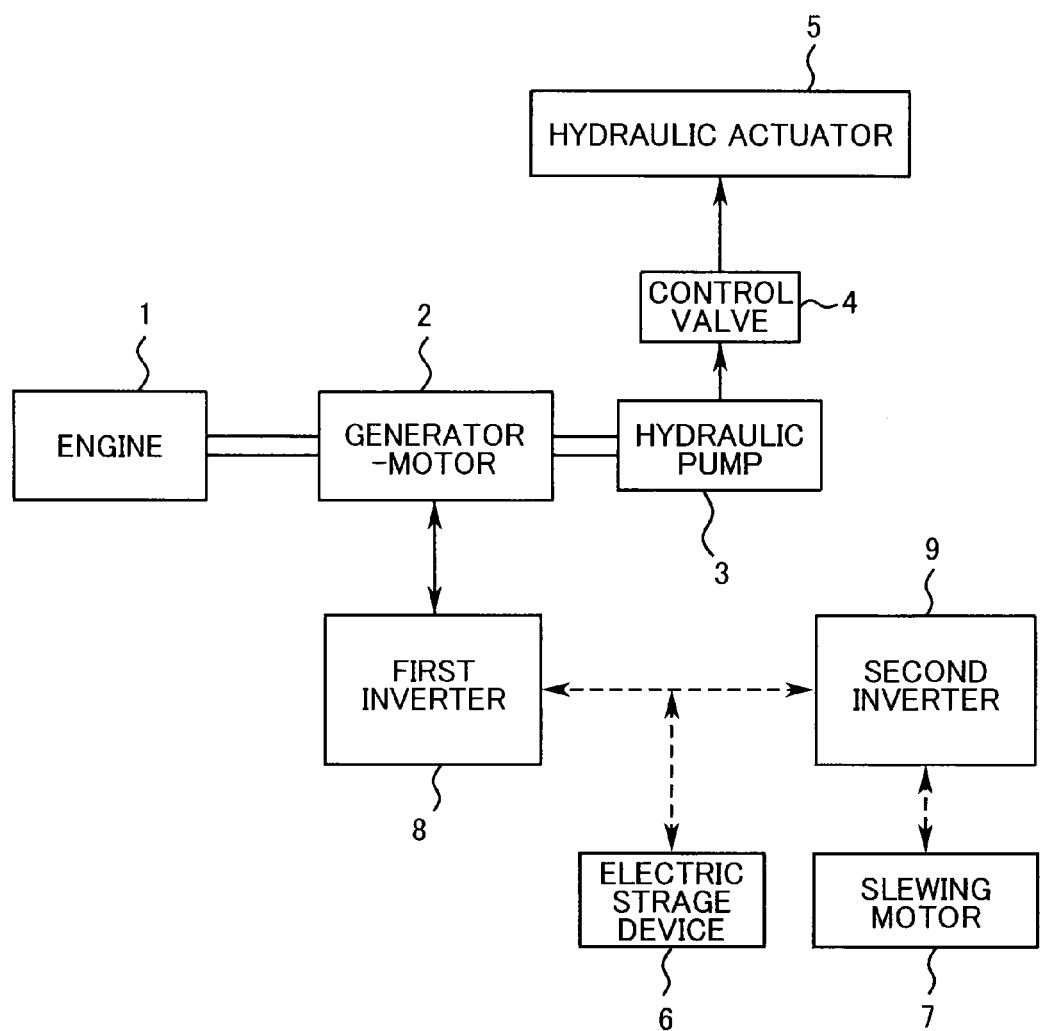

HYBRID CONSTRUCTION MACHINE

TECHNICAL FIELD

The present invention relates to a hybrid construction machine using an engine together with an electric storage device as a power source.

BACKGROUND ART

The background art is explained below by using a hybrid shovel as an example.

FIG. 7 shows the system configuration of the hybrid shovel.

The hybrid shovel is provided with an engine 1, a generator-motor 2 and a hydraulic pump 3 connected to the engine 1, a hydraulic actuator 5 driven by pressurized oil discharged from the hydraulic pump 3, a control valve 4 controlling the supply and discharge of the pressurized oil to and from the hydraulic actuator 5, and an electric storage device 6 charged by the electric power generated by the generator-motor 2. In such a hybrid shovel, the engine 1 is assisted by actuating the generator-motor 2 by the electric power charged into the electric storage device 6.

In addition to the generator-motor 2 and the electric storage device 6, the hybrid shovel is also provided with a slewing motor 7, a first inverter 8, and a second inverter 9 as equipment (referred to hereinbelow as "hybrid equipment") electrically connected to the electric storage device 6. The inverters 8 and 9 control the operation of the generator-motor 2 and the slewing motor 7 and also the charging and discharging of the electric storage device 6.

In such a hybrid shovel, sufficient power cannot be obtained at a low temperature because the electric storage device performance (discharge performance) is degraded due to the decrease in capacity of the electric storage device 6. For this reason, in a low-temperature environment, such as during the winter, it is desirable that the electric storage device 6 be also heated (warmed up) to an appropriate temperature (for example, 10° C. to 40° C.), similarly to the engine 1.

A technique for increasing the temperature of the electric storage device by internal heating of the electric storage device has been suggested as warming-up means (see Patent Document 1). More specifically, with the technique described in Patent Document 1, the generator-motor is actuated and the electric storage device is forcibly charged and discharged when the temperature of the electric storage device becomes equal to or lower than a preset value.

Meanwhile, where the electric storage device 6 is continuously used in a high-temperature state, the deterioration of the electric storage device 6 is accelerated. Therefore, it is necessary to cool the electric storage device 6 so that the temperature of the electric storage device 6 does not exceed the appropriate temperature.

Further, most of the hybrid equipment units, including the slewing motor 7 and inverters 8 and 9, also generate heat during usage. Therefore, the hybrid equipment also needs cooling in order to maintain the constant performance thereof.

A cooling circuit described in Patent Document 2 is known as means for cooling the electric storage device and the units of the hybrid equipment that need cooling (referred to hereinbelow as "equipment that needs cooling"). More specifically, with the cooling circuit described in Patent Document 2, the electric storage device and the equipment that needs cooling can be cooled by supplying cooling liquid by a cooling pump to the electric storage device and the equipment that needs cooling.

A problem associated with the technique described in Patent Document 1 is that the service life of the electric storage device 6 is shortened because the electric storage device 6 is charged and discharged at a low temperature, in particular by the increase in the number of charging cycles.

In particular when the electric storage device is charged and discharged, a larger current flows therein as the internal resistance thereof becomes smaller. As a consequence, the deterioration of the electric storage device advances easier as a lower internal resistance of the electric storage device.

Therefore, the technique described in Patent Document 1 is undesirable from the standpoint of protecting the electric storage device. Accordingly, the feature of increasing the temperature by pumping a heating medium into the electric storage device 6 can be considered.

However, where the temperature of the electric storage device 6 is raised by using a heating medium, the circuit configuration for maintaining the engine, electric storage device, and equipment that needs cooling at the appropriate temperatures increases in size and complexity. The first reason therefor is that a warming-up circuit and a cooling circuit, for example, such as described in Patent Document 2, should be additionally provided as circuits that are made independent by respective pipes in order to adjust the temperature of the electric storage device 6 to the appropriate temperature. The second reason is that two heat exchangers, namely, for warming up and cooling, are needed. Therefore, such a system is very inconvenient from the standpoint of space and cost.

Patent Document 1: Japanese Unexamined Patent Publication No. 2010-127271

Patent Document 2: WO 2008/015798

SUMMARY OF THE INVENTION

It is an object of the present invention to provide a hybrid construction machine in which the circuit configuration for maintaining the engine, electric storage device, and hybrid equipment at appropriate temperatures can be simplified and reduced in size.

In order to resolve the above-described problems, the present invention provides a hybrid construction machine including: an engine as a power source; an electric storage device that is set to an appropriate temperature lower than an appropriate temperature of the engine; equipment that needs cooling, including a motor and a controller therefor, and set to an appropriate temperature lower than the appropriate temperature of the electric storage device; an electric storage device temperature adjustment circuit for maintaining the electric storage device at the appropriate temperature; an engine cooling circuit cooling the engine with a first coolant; a warm-up switching valve that is provided in the engine cooling circuit and is capable of switching between an electric storage device warm-up position in which the first coolant after cooling the engine is introduced into the electric storage device temperature adjustment circuit and an electric storage device non-warm-up position in which the introduction of the first coolant into the electric storage device temperature adjustment circuit is stopped; an equipment cooling circuit that cools, with a second coolant, the equipment that needs cooling, and that is capable of switching between a state in which the second coolant is introduced into the electric storage device temperature adjustment circuit and a state in which the introduction of the second coolant into the electric storage device temperature adjustment circuit is stopped; a lead-out switching valve that is capable of switching between an engine-side lead-out position in which the first coolant located inside the electric storage device temperature adjustment circuit is led out to the engine cooling circuit, and an equipment-side lead-out position in which the second coolant located inside the electric storage device temperature adjustment circuit is led out to the equipment cooling circuit; an electric storage device temperature sensor detecting the temperature of the electric storage device; and control means for controlling operation of the warm-up switching valve, the equipment cooling circuit, and the lead-out switching valve in such a manner that the second coolant or the first coolant after cooling the engine selectively flows inside the electric storage device temperature adjustment circuit, according to whether the electric storage device needs to be warmed up or cooled, which is determined on the basis of the temperature of the electric storage device detected by the electric storage device temperature sensor.

In accordance with the present invention, the circuit configuration for maintaining the engine, electric storage device, and equipment that needs cooling at appropriate temperatures can be simplified and reduced in size.

BRIEF DESCRIPTION OF THE DRAWINGS

FIG. 3 illustrates the relationship between the processing and state of equipment in the flowchart shown in FIG. 2.

FIG. 6 illustrates the relationship between the processing and state of equipment in the flowchart shown in FIG. 5.

FIG. 7 is a hybrid system configuration diagram of the hybrid shovel.

BEST MODE FOR CARRYING OUT THE INVENTION

The embodiments of the present invention will be described hereinbelow with reference to the appended drawings. The below-described embodiments are merely examples of specific implementation of the present invention and place no limitation on the technical scope of the present invention.

Figure 1:
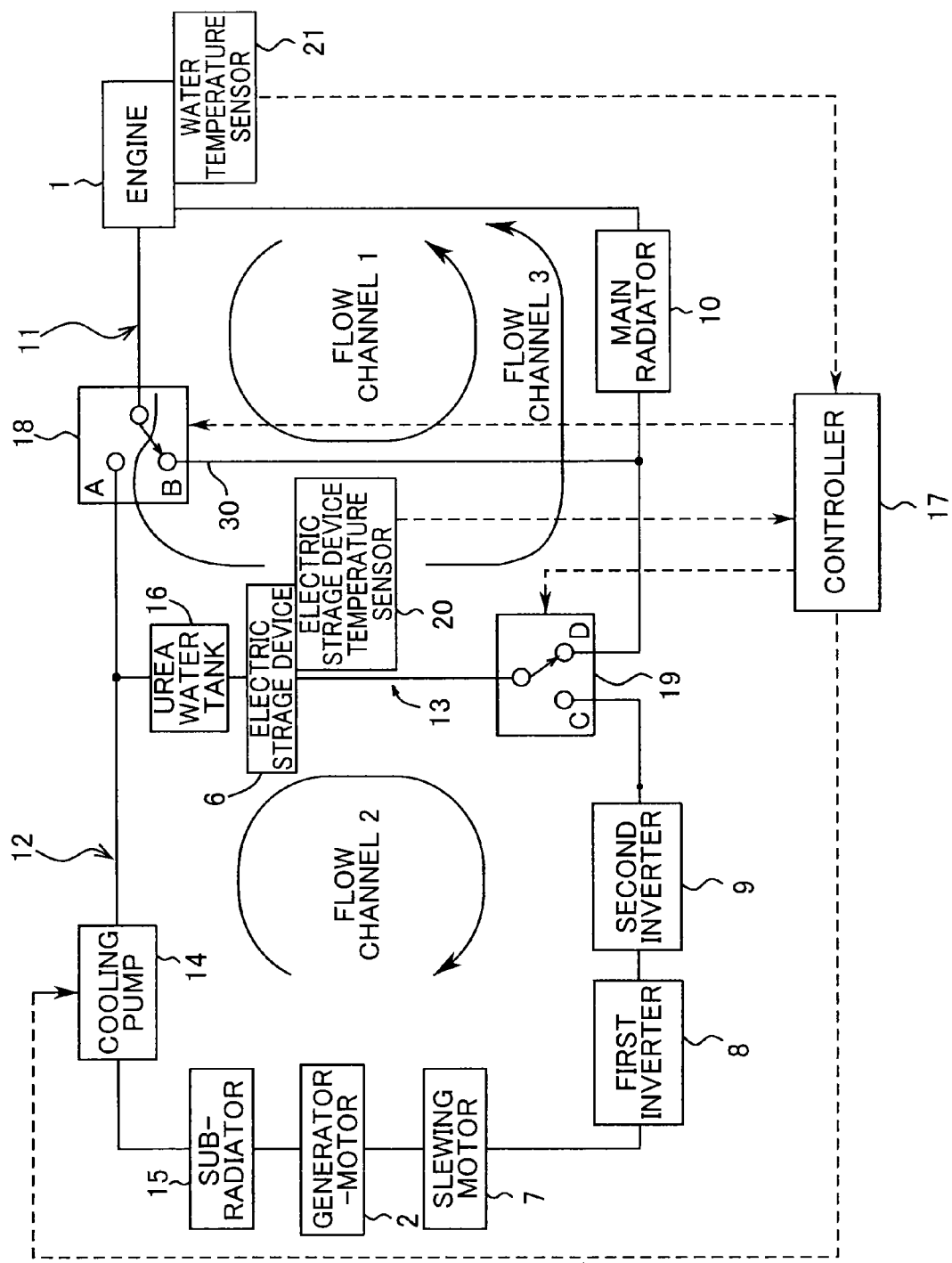
FIG. 1 is a configuration diagram of the warm-up/cooling system of the electric storage device according to the first embodiment of the present invention.
Figure 2:
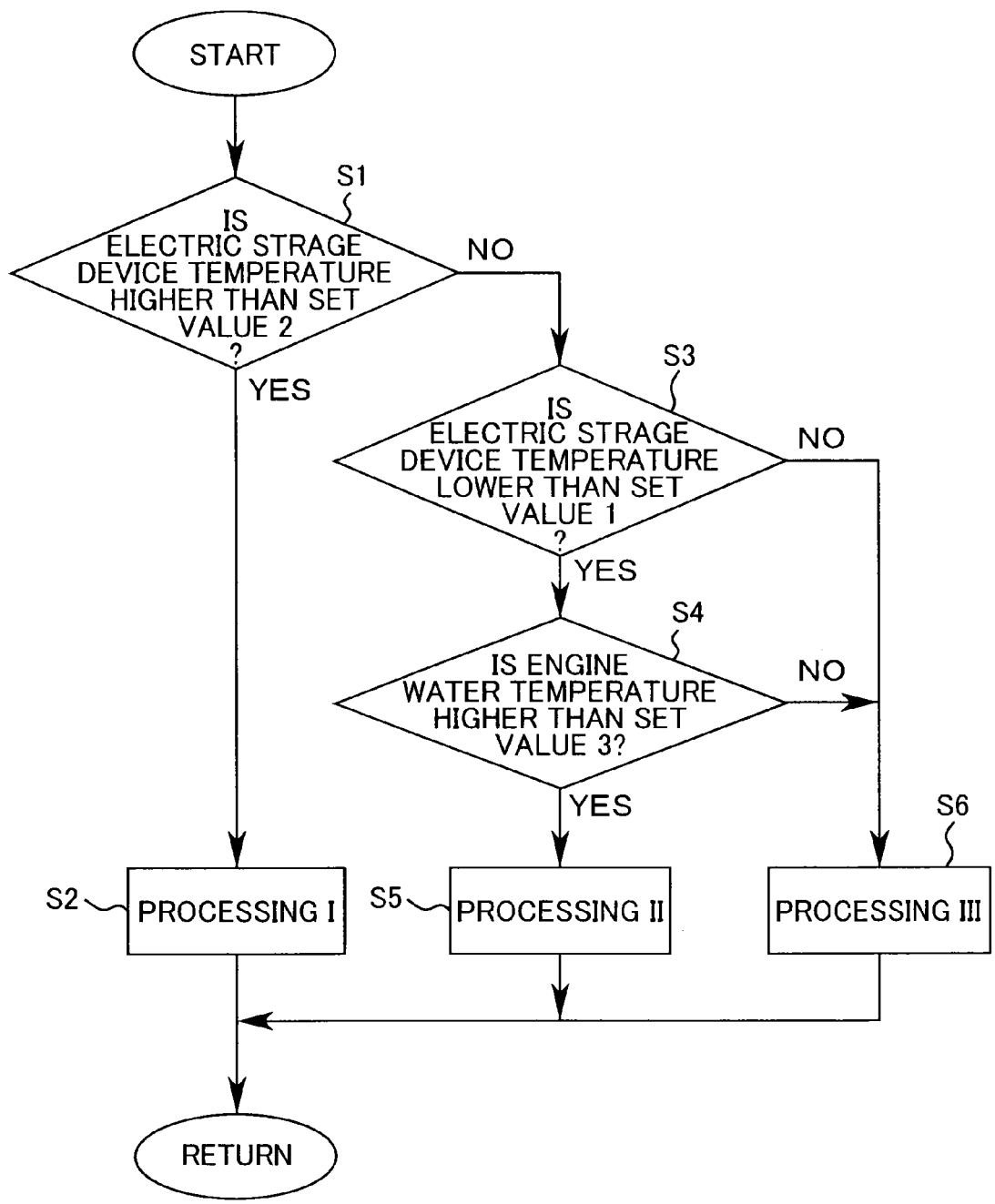
FIG. 2 is a flowchart illustrating the processing executed by the controller shown in FIG. 1.

First Embodiment (SEE FIGS. 1 to 3)

The basic configuration of the hybrid shovel according to the present embodiment is similar to that shown in FIG. 7.

More specifically, the hybrid shovel is provided with an engine 1 as a power source, a generator-motor 2 and a hydraulic pump 3 connected to the engine 1, a hydraulic actuator 5 driven by pressurized oil discharged from the hydraulic pump 3, a control valve 4 controlling the supply of the pressurized oil to the hydraulic actuator 5, and an electric storage device 6 that is charged by the electric power generated by the generator-motor 2. In such a hybrid shovel, the engine 1 is assisted by actuating the generator-motor 2 by the electric power charged into the electric storage device 6.

In addition to the generator-motor 2 and the electric storage device 6, the hybrid shovel is also provided with a slewing motor 7, a first inverter 8, and a second inverter 9 as equipment (referred to hereinbelow as "hybrid equipment") electrically connected to the electric storage device 6. The inverters 8 and 9 control the operation of the generator-motor 2 and the slewing motor 7 and also the charging and discharging of the electric storage device 6.

The hybrid shovel according to the present embodiment is also provided with an engine cooling circuit 11 cooling the engine 1 with engine cooling water (referred to hereinbelow as "first coolant"), an equipment cooling circuit 12 cooling the equipment, from among the hybrid equipment, that is the cooling object (referred to hereinbelow as "equipment that needs cooling"; in the present embodiment, the generator-motor 2, slewing motor 7, first inverter 8, and second inverter 9) with equipment cooling water (referred to hereinbelow as "second coolant"), an electric storage device temperature adjustment circuit 13 for maintaining the electric storage device 6 at an appropriate temperature by warming-up or cooling the electric storage device 6, an electric storage device temperature sensor 20 detecting the temperature of the electric storage device 6, a water temperature sensor 21 detecting the temperature of the first coolant, and a controller (control means) 17 inputting the detection results from the electric storage device temperature sensor 20 and the water temperature sensor 21.

The engine cooling circuit 11 is capable of switching between a state in which the first coolant after cooling the engine 1 is introduced into the electric storage device temperature adjustment circuit 13 and a state in which the introduction of the first coolant into the electric storage device temperature adjustment circuit 13 is stopped. More specifically, the engine cooling circuit 11 is provided with a main radiator 10 for cooling the first coolant, a pump (not shown in the figure) that is provided in the engine 1 and serves for circulating the first coolant inside the engine cooling circuit 11, an engine-side bypass circuit 30 that circulates the first coolant in the engine cooling circuit 11 so that the first coolant does not pass through the electric storage device temperature sensor 20, and a warm-up switching valve 18 for switching a flow channel 1 and a flow channel 3 of the first coolant. More specifically, the warm-up switching valve 18 is provided downstream of the engine 1, and the main radiator 10 is provided downstream of the warm-up switching valve 18. When the engine 1 is operated, the first coolant is circulated along the flow channel 1 or flow channel 3 to cool the engine 1 by the operation of the pump (not shown in the figure).

The warm-up switching valve 18 is capable of switching between an electric storage device warm-up position A in which the first coolant that is located in the engine cooling circuit 11 after cooling the engine 1 is introduced in the electric storage device temperature adjustment circuit 13 and an electric storage device non-warm-up position B in which the introduction of the first coolant into the electric storage device temperature adjustment circuit is stopped. More specifically, in a state of switching to the electric storage device non-warm-up position B, the first coolant is introduced into the engine-side bypass circuit 30.

The equipment cooling circuit 12 and the electric storage device temperature adjustment circuit 13 are provided separately from the engine cooling circuit 11.

The equipment cooling circuit is capable of switching between a state in which the second coolant is introduced into the electric storage device temperature adjustment circuit 13 and a state in which the introduction of the second coolant into the electric storage device temperature adjustment circuit 13 is stopped. More specifically, the equipment cooling circuit 12 is provided with a cooling pump 14 pumping the second coolant to the equipment that needs cooling and a sub-radiator 15 serving as a heat exchanger cooling the second coolant. The cooling pump 14 is capable of switching between an actuated state in which the second coolant is introduced into the electric storage device temperature adjustment circuit 13 and a non-actuated state in which the introduction of the second coolant into the electric storage device temperature adjustment circuit 13 is stopped. The second coolant pumped from the cooling pump 14 flows along the flow channel 2, passes through the electric storage device temperature adjustment circuit 13 and returns to the cooling pump 14 through the sub-radiator 15. In the course of this flow, the second coolant cools the equipment that needs cooling.

In this case, the units of the equipment that needs cooling, which is cooled by the equipment cooling circuit 12, are arranged in ascending order of upper limit value of the appropriate temperature thereof, from the outlet side of the sub-radiator 15. In other words, the second inverter 9, first inverter 8, slewing motor 7, and generator-motor 2 are disposed in the order of description from the upstream side to the downstream side in the flow direction of the flow channel 2.

Further, the appropriate temperatures of the engine 1, electric storage device 6, and equipment that needs cooling satisfy the following relationship. Thus, the appropriate temperature of the equipment that needs cooling is lower than the appropriate temperatures of the engine 1 and the electric storage device 6. The appropriate temperature of the electric storage device 6 is lower than that of the engine 1. Therefore, the first coolant after cooling the engine 1 is introduced into the below-described electric storage device temperature adjustment circuit 13, thereby the electric storage device 6 is warmed up, whereas the second coolant is introduced, thereby the electric storage device 6 is cooled.

The electric storage device temperature adjustment circuit 13 is provided with an urea water tank 16 storing urea water for enhancing the purification of the exhaust gas of the engine 1 and a lead-out switching valve 19 switching the lead-out paths of the coolant inside the electric storage device temperature adjustment circuit 13. More specifically, the urea water tank 16, electric storage device 6, and lead-out switching valve 19 are provided in the order of description from the upstream side toward the downstream side of the flow direction of the flow channel 2 and the flow channel 3 in the electric storage device temperature adjustment circuit 13. In other words, the urea water tank 16, electric storage device 6, and lead-out switching valve 19 are provided in series. Further, in FIG. 1, the urea water tank 16 is arranged upstream of the electric storage device 6, but it may be also arranged downstream of the electric storage device 6.

The lead-out switching valve 19 may be switched between an equipment-side lead-out position C in which the coolant (second coolant) located inside the electric storage device temperature adjustment circuit 13 is introduced to the equipment cooling circuit 12 and an engine-side lead-out position D in which the coolant (first coolant) located inside the electric storage device temperature adjustment circuit 13 is introduced to the engine cooling circuit 11.

Further, FIG. 1 illustrates the state in which the equipment that needs cooling and the electric storage device 6 are connected by pipes, but it is actually the water jackets provided on the outer circumference of the equipment that needs cooling and the electric storage device 6 that are connected by pipes. Further, the electric storage device 6 is warmed up by introducing the first coolant into the water jacket of the electric storage device 6. Meanwhile, the electric storage device 6 and the equipment that needs cooling are cooled by introducing the second coolant into the water jackets of the electric storage device 6 and the equipment that needs cooling.

The electric storage device temperature sensor 20 detects the temperature of the electric storage device 6. The water temperature sensor 21 detects the temperature of the first coolant. The temperature signals detected by the sensors 20 and 21 are inputted to the controller 17.

The controller 17 controls the operation of the engine cooling circuit 11 (warm-up switching valve 18), equipment cooling circuit 12 (cooling pump 14), and lead-out switching valve 19, in such a manner that the first coolant or the second coolant after cooling the engine 1 selectively flows inside the electric storage device temperature adjustment circuit 13, according to whether the electric storage device 6 needs to be warmed up or cooled, which is determined on the basis of the temperature of the electric storage device 6 detected by the electric storage device temperature sensor 20.

More specifically, the controller 17 stores the following set values 1 to 3. The set value 1 is a temperature serving as a reference for determining whether or not the temperature of the electric storage device 6 is a temperature at which the electric storage device 6 needs to be warmed up. The set value 2 is a temperature serving as a reference for determining whether or not the temperature of the electric storage device 6 is a temperature at which the electric storage device 6 needs cooling. The set value 3 is a temperature serving as a reference for determining whether or not the temperature of the first coolant is a temperature suitable for warming up the electric storage device 6.

More specifically, where the appropriate temperature of the electric storage device 6 is 10° C. to 40° C., the set values 1 to 3 are set in the following manner. The set values 1 and 3 are set to 10° C. which is the lower limit value of the appropriate temperature of the electric storage device 6. The set value 2 is set to 30° C. which is somewhat closer to the upper limit value (40° C.) of the appropriate temperature of the electric storage device 6.

Where the temperature of the electric storage device 6 detected by the electric storage device temperature sensor 20 is lower than the set value 1, and the temperature of the first coolant detected by the water temperature sensor 21 is higher than the set value 3, the controller 17 controls the operation of the warm-up switching valve 18, lead-out switching valve 19, and cooling pump 14 so that the first coolant is introduced to the electric storage device temperature adjustment circuit 13. When the temperature of the electric storage device 6 is higher than the set value 2, the controller 17 controls the operation of the warm-up switching valve 18, lead-out switching valve 19, and cooling pump 14 so that the second coolant is introduced to the electric storage device temperature adjustment circuit 13.

In other words, in a state in which the electric storage device 6 needs to be warmed up, the controller 17 sets the warm-up switching valve 18 to the electric storage device warm-up position A, sets the lead-out switching valve 19 to the engine-side lead-out position D, and sets the cooling pump 14 to the non-actuated state. Meanwhile, in a state in which the electric storage device 6 needs cooling, the controller 17 sets the lead-out switching valve 19 to the equipment-side lead-out position C, sets the cooling pump 14 to the actuated state, and sets the warm-up switching valve 18 to the electric storage device non-warm-up position B.

By such control performed by the controller 17, the electric storage device temperature adjustment circuit 13 forms the flow channel 3 with the engine cooling circuit 11 in a state in which the electric storage device 6 needs to be warmed up, but forms the flow channel 2 with the equipment cooling circuit 12 when the electric storage device 6 needs cooling. When the electric storage device 6 needs cooling, the flow channel 1 passing through the engine-side bypass circuit 30 is formed in the engine cooling circuit 11. In other words, in the present embodiment, the equipment cooling circuit 12 and the electric storage device temperature adjustment circuit 13 are connected directly, via no switching valve, so that the second coolant is introduced into the electric storage device temperature adjustment circuit 13 by actuating of the cooling pump 14 in a state in which the warm-up switching valve 18 is set to the electric storage device non-warm-up position B.

The processing executed by the controller 17 will be explained below with reference to FIGS. 2 and 3.

(i) Cooling of Electric Storage Device

In the flowchart shown in FIG. 2, where the control is started, it is determined in step S1 whether or not the temperature of the electric storage device 6 is higher than the set value 2. Where the temperature of the electric storage device 6 is higher than the set value 2 (YES in step S1), it is determined that electric storage device 6 needs cooling and the processing I is executed in step S2.

Thus, as shown in FIG. 3, the warm-up switching valve 18 is switched to the electric storage device non-warm-up position B, the lead-out switching valve 19 is switched to the equipment-side lead-out position C, and the cooling pump 14 is actuated.

As a result, the first coolant flows along the flow channel 1 from the engine 1 directly into the main radiator 10 through the engine-side bypass circuit 30. As a result, only the engine 1 is cooled.

Meanwhile, the second coolant flows along the flow channel 2 in the equipment cooling circuit 12 and the electric storage device temperature adjustment circuit 13. More specifically, the second coolant passes from the cooling pump 14 through the urea water tank 16, electric storage device 6, second inverter 9, first inverter 8, slewing motor 7, generator-motor 2, and sub-radiator 15 and returns to the cooling pump 14. Thereby, the electric storage device 6 and the urea water tank 16 are cooled and maintained at appropriate temperatures together with the equipment that needs cooling (generator-motor 2, slewing motor 7, and inverters 8 and 9).

In FIG. 3, the reference symbol "O" means that the coolant flows in the flow channels 1 to 3, and the reference symbol "x" means that the coolant flow is stopped.

(ii) Warm-Up of Electric Storage Device

In the case of NO (the temperature of the electric storage device 6 is lower than the set value 2) in step S1, it is determined in step S3 whether or not the temperature of the electric storage device 6 is lower than the set value 1. Where the temperature of the electric storage device 6 is lower than the set value 1 (YES in step S1), it is determined in step S4 whether or not the temperature of the second coolant (engine cooling water) is higher than the set value 3.

In the case of YES in step S4, it is determined that a state is assumed in which the electric storage device 6 should be warmed up, and the processing II is executed in step S5.

Thus, the warm-up switching valve 18 is switched to the electric storage device warm-up position A, the lead-out switching valve 19 is switched to the engine-side lead-out position D, and the operation of the cooling pump 14 is stopped.

As a result, the flow of the second coolant in the flow channel 2 is stopped. Meanwhile, the first coolant flows along the flow channel 3 from the engine 1 to the main radiator 10 through the electric storage device temperature adjustment circuit 13.

As a result, the cooling of the equipment that needs cooling is stopped, and the electric storage device 6 and the urea water tank 16 are warmed up by the first coolant.

(iii) Non-Warming-Up and Non-Cooling of Electric Storage Device

In the case of NO in step S3 (the case in which the temperature of the electric storage device 6 is equal to or higher than the set value 1) and in the case of NO in step S4 (the case in which the temperature of the first coolant is equal to or lower than the set value 3), it is determined that electric storage device 6 does not need to be warmed up, and the processing III is executed in step S6.

Thus, the warm-up switching valve 18 is switched to the electric storage device non-warm-up position B, the lead-output switching valve 19 is switched to the equipment-side lead-out position C, and the operation of the cooling pump 14 is stopped.

As a result, only the flow along the flow channel 1 is formed, and the flows along the flow channel 2 and the flow channel 3 are stopped.

Thereby, only the cooling of the engine 1 is thus performed, and neither warm-up nor cooling is performed with respect to the electric storage device 6, urea water tank 16, and the equipment that needs cooling.

As above, the appropriate temperature of the electric storage device 6 is lower than the appropriate temperature of the engine 1 and higher than the appropriate temperature of the equipment that needs cooling. Therefore, the first coolant of the engine cooling circuit 11 can be used to warm up the electric storage device 6, whereas the second coolant of the equipment cooling circuit 12 can be used for cooling the electric storage device 6. In consideration of this point, the inventors of the present application have conceived of the present invention in which the electric storage device temperature adjustment circuit 13 is connected to the engine cooling circuit 11 and the equipment cooling circuit 12, and the first coolant or second coolant is selectively introduced in the electric storage device temperature adjustment circuit 13 by the control of the warm-up switching valve 18, lead-out switching valve 19, and cooling pump 14. Thereby, the electric storage device 6 can be warmed up or cooled by introducing the first coolant into the electric storage device 6 when the electric storage device 6 needs to be warmed up and introducing the second coolant in the electric storage device 6 when the electric storage device 6 needs to be cooled. Therefore, according to the present embodiment, the electric storage device temperature adjustment circuit 13 can be used both for warming up and cooling, and the heat exchangers (the main radiator 10 and the sub-radiator 15 of the two cooling circuits 11 and 12) can be used without any modification thereof.

Therefore, the configuration of the circuit for maintaining the engine 1, electric storage device 6, and equipment that needs cooling at the appropriate temperatures is simplified and reduced in size and made very convenient in terms of space and cost.

The following effects can be obtained with such a configuration.

(a) The electric storage device 6 is warmed up by the first coolant. Therefore, unlike the technique described in Patent Document 1 in which the electric storage device 6 is forcibly charged and discharged at a low temperature, the adverse effect on the service life of the electric storage device 6 can be reduced.

(b) The temperature of the electric storage device 6 is detected by the electric storage device temperature sensor 20, and warming up and cooling are switched or warming up and cooling are stopped according to the temperature of the electric storage device 6. Therefore, the electric storage device 6 can be reliably maintained at the appropriate temperature.

(c) The temperature of the first coolant of the engine cooling circuit 11 is detected by the water temperature sensor 21, and it is determined that the electric storage device 6 needs to be warmed up when the temperature of the first coolant is suitable for warming up the electric storage device 6 (when it is a temperature higher than the set value 3). Thereby, the electric storage device 6 can be prevented from being warmed by the first coolant with a temperature that has not yet increased to the adequate level, as happens immediately after the engine 1 is started in winter or in cold regions. Therefore, the electric storage device 6 can be warmed up more reliably.

In particular, in the present embodiment, the engine-side bypass circuit 30 is provided for circulating the first coolant only in the engine cooling circuit 11, without passing the first coolant through the electric storage device temperature adjustment circuit 13. Therefore, a transition can be rapidly made from a stage at which the temperature of the first coolant is low to a stage at which the electric storage device 6 can be warmed up. More specifically, by circulating the first coolant having a temperature that has not yet increased to the adequate level in the engine cooling circuit 11, it is possible to raise the temperature to the adequate level.

Further, in the present embodiment, the temperature of the electric storage device 6 cannot be further reduced by the supply of the low-temperature first coolant to the electric storage device 6.

Therefore, good warm-up efficiency of the electric storage device 6 is obtained.

(d) In the present embodiment, the equipment units that need cooling (generator-motor 2, slewing motor 7, first inverter 8, and second inverter 9) of the equipment cooling circuit 12 are arranged in ascending order of upper limit value of the appropriate temperature from the outlet side of the sub-radiator 15. Thereby, the second coolant flowing out of the sub-radiator 15 flows in the direction from the equipment that needs cooling, which has a low upper limit value of the appropriate temperature, to the equipment that needs cooling, which has a high upper limit value of the appropriate temperature. Therefore, all units of the equipment that needs cooling can be efficiently cooled to the appropriate temperatures and the equipment units that need cooling can be maintained at the appropriate temperatures.

(e) In the present embodiment, the urea water tank 16 constituting the exhaust gas purification system of the engine 1 is provided in the electric storage device temperature adjustment circuit 13. As a result, when urea water is used for enhancing the exhaust gas purification, the circuit configuration is simplified, thereby making it possible to reduce the cost. More specifically, in the conventional configuration, the urea water is prevented from freezing by heating the urea water by introducing the first coolant into the urea water tank 16. Accordingly, in the present embodiment, since the urea water tank 16 is provided in the electric storage device temperature adjustment circuit 13, it is not necessary to provide a separate heating circuit for the urea water tank 16. As a result, the circuit configuration is simplified and the cost can be reduced.

Further, the appropriate temperature (for example 10° C. to 40° C.) of the electric storage device 6 is within a range of the appropriate temperature (for example, 0° C. to 40° C.) of urea water. Therefore, by adjusting the electric storage device 6 to the appropriate temperature, it is also possible to adjust the urea water to the appropriate temperature. In other words, no separate control is needed to be performed for adjusting the temperature of urea water, and the electric storage device 6 and urea water can be maintained at the appropriate temperatures by performing the above-described switching control of the warm-up switching valve 18 and the lead-out switching valve 19. Therefore, the control for maintaining the urea water temperature is facilitated.

Figure 4:
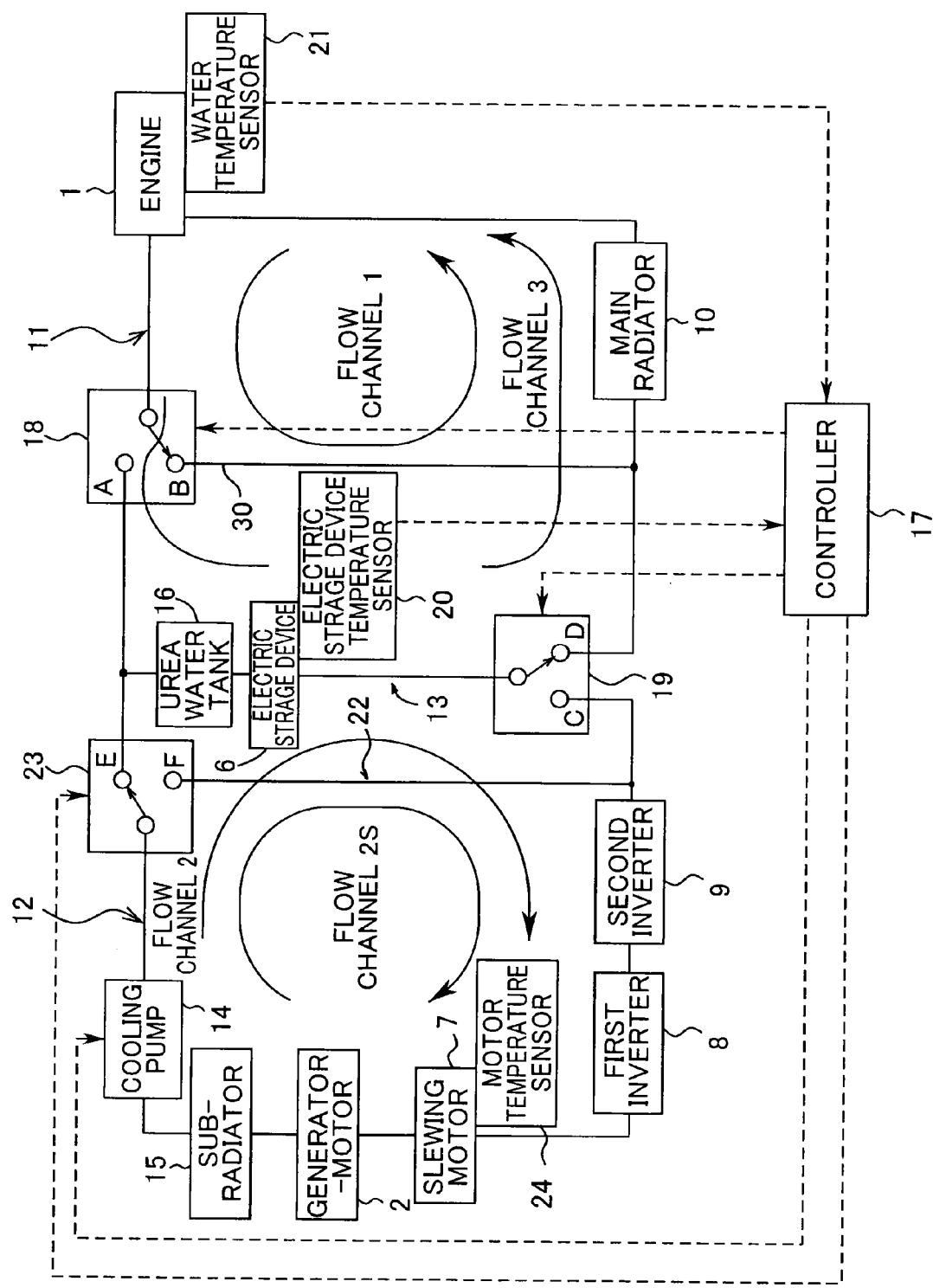
FIG. 4 is a configuration diagram of the warm-up/cooling system of the electric storage device according to the second embodiment of the present invention.
Figure 5:
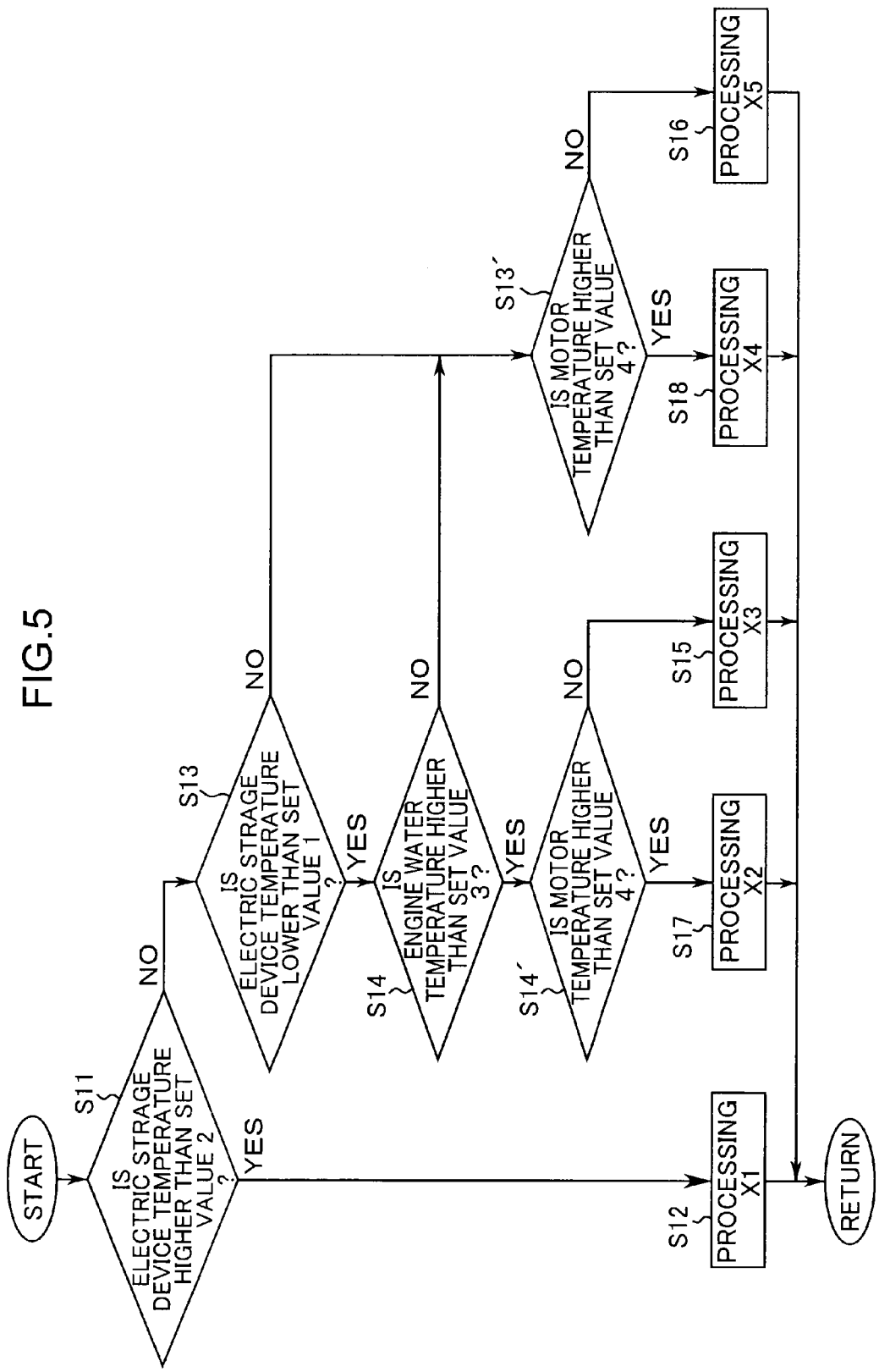
FIG. 5 is a flowchart illustrating the processing executed by the controller shown in FIG. 4.

Second Embodiment (SEE FIGS. 4 to 6)

Only the difference between the first embodiment and the second embodiment is explained below.

In the first embodiment, the electric storage device temperature adjustment circuit 13 is directly connected to the equipment cooling circuit 12. As a result, the equipment that needs cooling cannot be cooled in the warm-up operation of the electric storage device 6.

As a result, in particular when the warm-up operation of the electric storage device 6 is performed for a long time or frequently, the equipment that needs cooling can be heated to a high temperature.

Accordingly, in the second embodiment, a configuration is used for cooling the equipment that needs cooling in parallel with the warm-up operation of the electric storage device 6 when the temperature of the equipment that needs cooling exceeds the appropriate temperature during the warm-up operation of the electric storage device 6.

More specifically, the equipment cooling circuit 12 according to the second embodiment includes an equipment-side bypass circuit 22 for circulating the second coolant only in the equipment cooling circuit 12, without passing the second coolant through the electric storage device temperature adjustment circuit 13, a cooling switching valve 23 that switches the flow of the second coolant by the switching control performed by the controller 17, and a motor temperature sensor (equipment temperature sensor) 24 that detects the temperature of the slewing motor 7, from among the equipment units that need cooling, and sends the detected temperature value to the controller 17.

The hybrid shovel may also include an equipment temperature sensor for detecting the temperature of the equipment that needs cooling, which is other than the slewing motor 7.

The cooling switching valve 23 is provided between the cooling pump 14 and the urea water tank 16. The cooling switching valve 23 is capable of switching between an electric storage device cooling position E in which the second coolant is introduced into the electric storage device temperature adjustment circuit 13 and an electric storage device non-cooling position F in which the introduction of the second coolant into the electric storage device temperature adjustment circuit 13 is stopped. More specifically, in the electric storage device non-cooling position F, the second coolant is introduced to the equipment-side bypass circuit 22, without being introduced to the electric storage device temperature adjustment circuit 13.

The controller 17 according to the present embodiment sets the warm-up switching valve 18 to the electric storage device warm-up position A, sets the cooling switching valve 23 to the electric storage device non-cooling position F, and sets the lead-out switching valve 19 to the engine-side lead-out position D when the electric storage device 6 needs to be warmed up. Meanwhile, the controller 17 sets the cooling switching valve 23 to the electric storage device cooling position E, sets the warm-up switching valve 18 to the electric storage device non-warm-up position B, and sets the lead-out switching valve 19 to the equipment-side lead-out position C when the electric storage device 6 needs to be cooled.

Further, the controller 17 determines whether or not the electric storage device 6 needs to be warmed up and the equipment needs to be cooled on the basis of the temperature of the electric storage device 6 and the temperature of the slewing motor 7 detected by the electric storage device temperature sensor 20 and the motor temperature sensor 24. Where it is determined that the electric storage device needs to be warmed up and the equipment needs to be cooled, the controller 17 sets the cooling switching valve 23 to the electric storage device non-cooling position F and actuates the cooling pump 14 so that the operations of warming up the electric storage device 6 and cooling the equipment that needs to be cooled are performed in parallel.

More specifically, the controller 17 stores a set value 4 (for example, 50° C.) in addition to the set values 1 to 3. The set value 4 is used as a reference for determining whether or not the temperature of the slewing motor 7 is a temperature at which cooling is needed. More specifically, the controller 17 controls the operation of the switching valves 18, 19, and 23 and the cooling pump 14 so that the second coolant is introduced to the equipment-side bypass circuit 22 only when the temperature of the slewing motor 7 exceeds the set value 4 during the warm-up operation of the electric storage device 6.

The processing executed by the controller 17 is explained below with reference to FIGS. 5 and 6.

Steps S11, S12, S13, S14, S15, and S16 in the flowchart shown in FIG. 5 are the same as steps S1, S2, S3, S4, S5, and S6 of the first embodiment (FIG. 2). Processing X1 is the same as the processing I. Processing X3 is the same as the processing II. Processing X5 is the same as processing III.

Thus, where the temperature of the electric storage device 6 is higher than the set value 2 (the case of YES in step S11), the warm-up switching valve 18 is switched to the electric storage device non-warm-up position B, the lead-out valve 19 is switched to the equipment-side lead-out position C, the cooling switching valve 23 is switched to the electric storage device cooling position E, and the cooling pump 14 is actuated as the processing X1 of step S12.

Further, in the processing X1, the cooling switching valve 23 is set to the electric storage device cooling position E. As a result, the second coolant does not flow along the flow channel 2S between the equipment cooling circuit 12 and the equipment-side bypass circuit 22. Meanwhile, the second coolant flows in the equipment cooling circuit 12 and the electric storage device temperature adjustment circuit 13 along the flow channel 2.

For this reason, the electric storage device 6 and the urea water tank 16 are cooled and maintained at the appropriate temperatures together with the units of the equipment that needs cooling (generator-motor 2, slewing motor 7, both inverters 8 and 9).

Meanwhile, the first coolant directly flows from the engine 1 through the engine-side bypass circuit 30 to the main radiator 10 along the flow channel 1. As a result, the engine 1 is cooled.

Where the electric storage device temperature is lower than the set value 1 and the engine water temperature is higher than the set value 3 (the case of YES in steps S13 and S14), it is determined in step S14' whether or not the temperature of the slewing motor 7 is higher than the set value 4. In this case, where it is determined that the temperature of the slewing motor 7 is equal to or lower than the set value 4 (the case of NO in step S14'), it is determined that the electric storage device 6 needs warm-up and the equipment that needs cooling needs no cooling. More specifically, in the processing X3 of step S15, the warm-up switching valve 18 is switched to the electric storage device warm-up position A, the lead-out switching valve 19 is switched to the engine-side lead-out position D, the cooling switching valve 23 is switched to the electric storage device non-cooling position F, and the cooling pump 14 is set OFF.

Thereby, the warm-up operation of the electric storage device 6 is performed. The cooling of the equipment that needs cooling is stopped.

In the case of NO in step S13 (the case in which the temperature of the electric storage device 6 is equal to or higher than the set value 1), it is determined in step S13' whether or not the temperature of the slewing motor 7 is higher than the set value 4. In the case of NO in step S13' (the case in which the temperature of the slewing motor 7 is equal to or lower than the set value 4), it is determined that the electric storage device 6 does not need to be warmed up and the equipment that needs cooling does not require cooling. In other words, in the processing X5 of step S16, the warm-up switching valve 18 is switched to the electric storage device non-warm-up position B, the lead-out switching valve 19 is switched to the equipment-side lead-out position C, the cooling switching valve 23 is switched to the electric storage device non-cooling position F, and the cooling pump 14 is set OFF.

As a result, only the flow of the first coolant along the flow channel 1 is generated, and the flow of coolants along the flow channel 2, flow channel 2S, and flow channel 3 is stopped. Thereby, only the cooling of the engine 1 is performed.

Meanwhile, in the case of YES in step S14' (the case in which the temperature of the slewing motor 7 is higher than the set value 4), that is, in a state in which the electric storage device 6 needs to be warmed up and the equipment that needs cooling needs to be cooled, the processing X2 is executed in step S17.

In other words, the warm-up switching valve 18 is switched to the electric storage device warm-up position A, the lead-out switching valve 19 is switched to the engine-side lead-out position D, the cooling switching valve 23 is set to the electric storage device non-cooling position F, and the cooling pump 14 is actuated.

Thereby, the flow of coolants along the flow channel 1 and the flow channel 2 is stopped. Meanwhile, the second coolant flows along the flow channel 2S through the equipment-side bypass circuit 22 to the equipment that needs cooling, and the first coolant is introduced along the flow channel 3 into the electric storage device temperature adjustment circuit 13. As a result, the warm-up of the electric storage device 6 and the cooling of the equipment that needs cooling are performed in parallel.

In other words, in a state in which the electric storage device 6 needs to be warmed up and the equipment that needs cooling needs to be cooled, the warm-up of the electric storage device 6 and the cooling of the equipment that needs cooling are performed in parallel.

According to the present embodiment, unlike the case in which the circuit with the preferential warming-up of the electric storage device 6 is configured, it is possible to avoid a state in which the cooling of the equipment that needs cooling is kept stopping and the temperature of the equipment that needs cooling rises during the warm-up of the electric storage device 6. Conversely, unlike the case in which the circuit with the preferential cooling of the equipment that needs cooling is configured, it is possible to avoid a state in which the warm-up of the electric storage device 6 is interrupted to cool the equipment that needs cooling. Therefore, both the electric storage device 6 and the equipment that needs cooling can be reliably maintained at the appropriate temperatures.

In the case of YES in step S13', that is, when the electric storage device 6 is at the appropriate temperature and the temperature of the slewing motor 7 is higher than the set value 4, the processing X4 is executed in step S18. More specifically, in step S18, the warm-up switching valve 18 is switched to the electric storage device non-warm-up position B, the lead-out switching valve 19 is switched to the equipment-side lead-out position C, the cooling switching valve 23 is switched to the electric storage device non-cooling position F, and the cooling pump 14 is actuated.

Thereby, the flow of coolants along the flow channel 2 and the flow channel 3 is stopped. Meanwhile, the flow of the first coolant along the flow channel 1 is formed, and the flow of the second coolant along the flow channel 2S is formed. As a result, the engine 1 and the equipment that needs cooling can be cooled in a state in which the electric storage device 6 is neither warmed up nor cooled.

Other Embodiments (1) In the above-described embodiments, the plurality of equipment units that needs cooling is provided in the equipment cooling circuit 12, but such a configuration is not limiting. For example, the plurality of equipment units that needs cooling can be divided into a first group with the appropriate temperature close to that of the electric storage device 6 and a second group including units other than the units in the first group, and only the first group can be provided in the equipment cooling circuit 12.

(2) In the above-described embodiments, the electric storage device temperature adjustment circuit 13 is used for warming up or cooling the urea water tank 16, but such a configuration is not limiting. More specifically, a separate circuit may be provided for warming up or cooling the urea water tank 16.

(3) In the above-described embodiments, the temperature of the first coolant being higher than the set value 3 is used as a condition for warming up the electric storage device 6, but such a configuration is not limiting. More specifically, the above condition may be omitted in the case where the first coolant is at a temperature suitable for warming up the electric storage device 6 at almost all times, as in warm regions.

(4) In the above-described embodiments, water is used as the cooling medium (second coolant) for the equipment cooling circuit 12, but a cooling medium other than water (cooling liquid such as oil or cooling gas) may be also used.

(5) The present invention is not limited to the hybrid shovel and can be also applied to other hybrid construction machines having a similar equipment configuration.

The above-described specific embodiments mainly include the invention having the following features.

Thus, the present invention provides a hybrid construction machine including: an engine as a power source; an electric storage device that is set to an appropriate temperature lower than an appropriate temperature of the engine; equipment that needs cooling, including a motor and a controller therefor, and set to an appropriate temperature lower than the appropriate temperature of the electric storage device; an electric storage device temperature adjustment circuit for maintaining the electric storage device at the appropriate temperature; an engine cooling circuit cooling the engine with a first coolant; a warm-up switching valve that is provided in the engine cooling circuit and is capable of switching between an electric storage device warm-up position in which the first coolant after cooling the engine is introduced into the electric storage device temperature adjustment circuit and an electric storage device non-warm-up position in which the introduction of the first coolant into the electric storage device temperature adjustment circuit is stopped; an equipment cooling circuit that cools, with a second coolant, the equipment that needs cooling, and that is capable of switching between a state in which the second coolant is introduced into the electric storage device temperature adjustment circuit and a state in which the introduction of the second coolant into the electric storage device temperature adjustment circuit is stopped; a lead-out switching valve that is capable of switching between an engine-side lead-out position in which the first coolant located inside the electric storage device temperature adjustment circuit is led out to the engine cooling circuit, and an equipment-side lead-out position in which the second coolant located inside the electric storage device temperature adjustment circuit is led out to the equipment cooling circuit; an electric storage device temperature sensor detecting the temperature of the electric storage device; and control means for controlling operation of the warm-up switching valve, the equipment cooling circuit, and the lead-out switching valve in such a manner that the second coolant or the first coolant after cooling the engine selectively flows inside the electric storage device temperature adjustment circuit, according to whether the electric storage device needs to be warmed up or cooled, which is determined on the basis of the temperature of the electric storage device detected by the electric storage device temperature sensor.

In accordance with the present invention, the electric storage device is maintained at the appropriate temperature by selectively causing the first coolant and second coolant to flow to the electric storage device temperature adjustment circuit.

More specifically, since the appropriate temperature of the electric storage device is lower than the appropriate temperature of the engine, the first coolant after cooling the engine can be used for warming up the electric storage device. Meanwhile, since the appropriate temperature of the electric storage device is higher than the appropriate temperature of the equipment that needs cooling, the second coolant can be used for cooling the electric storage device. In consideration of this point, the inventors have conceived of the present invention in which the first coolant or the second coolant is selectively caused to flow to the electric storage device temperature adjustment circuit by controlling the engine cooling circuit, equipment cooling circuit, and lead-out switching valve. As a result, the electric storage device can be warmed up or cooled by guiding the first coolant to the electric storage device when the electric storage device needs to be warmed up and guiding the second coolant to the electric storage device when the electric storage device needs to be cooled.

In accordance with the present invention, the electric storage device temperature adjustment circuit can be used both for warming up and cooling and the heat exchangers of the two cooling circuits can be used without any modification thereof.

Further, in accordance with the present invention, the electric storage device is warmed up by the first coolant. Therefore, unlike the technique described in Patent Document 1 in which the electric storage device is forcibly charged and discharged at a low temperature, the adverse effect on the service life of the electric storage device can be reduced.

Further, in accordance with the present invention, the temperature of the electric storage device is detected by the electric storage device temperature sensor, and warming up and cooling are switched or warming up and cooling are stopped according to the temperature of the electric storage device. Consequently, the electric storage device can be reliably maintained at the appropriate temperature.

In the hybrid construction machine, it is preferred that the equipment cooling circuit have a cooling pump capable of switching between an actuated state in which the second coolant is introduced into the electric storage device temperature adjustment circuit and a non-actuated state in which the introduction of the second coolant into the electric storage device temperature adjustment circuit is stopped; and the control means (A) set the warm-up switching valve to the electric storage device warm-up position, set the cooling pump to the non-actuated state, and set the lead-out switching valve to the engine-side lead-out position in a state in which the electric storage device needs to be warmed up; and (B) set the cooling pump to the actuated state, set the warm-up switching valve to the electric storage device non-warm-up position, and set the lead-out switching valve to the cooling-side lead-out position in a state in which the electric storage device needs cooling.

In this aspect, the cooling pump is provided that switches between the supply of the second coolant to the electric storage device temperature adjustment circuit and a stop of the supply. Therefore, the coolant introduced into the electric storage device temperature adjustment circuit can be selectively switched by controlling the operation of the warm-up switching valve and the cooling pump.

In the hybrid construction machine, it is preferred that the equipment-side cooling circuit have a cooling switching valve capable of switching between an electric storage device cooling position in which the second coolant is introduced into the electric storage device temperature adjustment circuit and an electric storage device non-cooling position in which the introduction of the second coolant into the electric storage device temperature adjustment circuit is stopped; and the control means (A) set the warm-up switching valve to the electric storage device warm-up position, set the cooling switching valve to the electric storage device non-cooling position, and set the lead-out switching valve to the engine-side lead-out position in a state in which the electric storage device needs to be warmed up; and (B) set the cooling switching valve to the electric storage device cooling position, set the warm-up switching valve to the electric storage device non-warm-up position, and set the lead-out switching valve to the equipment-side lead-out position in a state in which the electric storage device needs cooling.

In this aspect, the cooling switching valve is provided that switches between the supply of the second coolant to the electric storage device temperature adjustment circuit and a stop of the supply. Therefore, the coolant introduced into the electric storage device temperature adjustment circuit can be selectively switched by controlling the operation of the warm-up switching valve and the cooling switching valve.

In the hybrid construction machine, it is preferred that the equipment-side cooling circuit have an equipment-side bypass circuit for circulating the second coolant only in the equipment cooling circuit, without passing the second coolant through the electric storage device temperature adjustment circuit; and the cooling switching valve supply the second coolant to the electric storage device temperature adjustment circuit in the electric storage device cooling position, and supply the second coolant to the equipment-side bypass circuit in the electric storage device non-cooling position.

In this aspect, the equipment that needs cooling can be cooled during the warm-up operation of the electric storage device.

In other words, unlike the case in which the circuit with the preferential warm-up of the electric storage device is configured, it is possible to avoid a state in which the cooling of the equipment that needs cooling is kept stopping and the temperature of the equipment that needs cooling rises during the warm-up of the electric storage device. Conversely, unlike the case in which the circuit with the preferential cooling of the equipment that needs cooling is configured, it is possible to avoid a state in which the warm-up of the electric storage device is interrupted to cool the equipment that needs cooling.

More specifically, the configuration can be used that further includes an equipment temperature sensor that detects a temperature of the equipment that needs cooling, and supplies the detected temperature to the control means, wherein the equipment cooling circuit has a cooling pump capable of switching between an actuated state in which the second coolant is supplied to the cooling switching valve and a non-actuated state in which the supply of the second coolant to the cooling switching valve is stopped; and the control means sets the cooling switching valve to the electric storage device non-cooling position and actuates the cooling pump so that the warming up of the electric storage device and cooling of the equipment that needs cooling are performed in parallel when it is determined that the electric storage device needs to be warmed up and cooling of the equipment that needs cooling is required on the basis of the temperature of the electric storage device and the temperature of the equipment that needs cooling that are detected by the electric storage device temperature sensor and the equipment temperature sensor, respectively.

As a result, the equipment that needs cooling can be cooled during the warm-up operation of the electric storage device.

In the hybrid construction machine, it is preferred that the engine cooling circuit have an engine-side bypass circuit that circulates the first coolant only in the engine cooling circuit, without passing the first coolant through the electric storage device temperature adjustment circuit; and the warm-up switching valve supply the first coolant to the electric storage device temperature adjustment circuit in the electric storage device warm-up position, and supply the first coolant to the engine-side bypass circuit in the electric storage device non-warm-up position.

In this aspect, the electric storage device can be cooled during the cooling operation of the engine.

In other words, unlike the case in which the circuit with the preferential cooling of the electric storage device is configured, it is possible to avoid a state in which the cooling of the engine is kept stopping and the temperature of the engine rises during the cooling of the electric storage device. Conversely, unlike the case in which the circuit with the preferential cooling of the engine is configured, it is possible to avoid a state in which the cooling of the electric storage device is interrupted to cool the engine.

Therefore, when the above-described warm-up switching valve, cooling switching valve, equipment-side bypass circuit, and engine-side bypass circuit are provided, the engine, electric storage device, and equipment that needs cooling can be all reliably maintained at the appropriate temperatures.

The hybrid construction machine preferably further includes a water temperature sensor detecting a temperature of the first coolant, wherein the control means determines that the electric storage device needs to be warmed up when the temperature of the electric storage device is lower than a preset temperature and the temperature of the first coolant detected by the water temperature sensor is higher than a preset temperature.

In this aspect, it is determined that the electric storage device needs to be warmed up when the temperature of the first coolant is higher than the preset temperature of the electric storage device. As a result, the electric storage device can be prevented from being warmed up by the first coolant with a temperature that has not yet increased to the adequate level, as happens immediately after the engine is started in winter or in cold regions. Therefore, the electric storage device can be warmed up more reliably.

In particular, when the engine-side bypass circuit is provided for circulating the first coolant only in the engine cooling circuit, without passing the first coolant through the electric storage device temperature adjustment circuit, as described hereinabove, a transition can be rapidly made from a stage at which the temperature of the first coolant is low to a stage at which the electric storage device can be warmed up. More specifically, by circulating the first coolant having a temperature that has not yet increased to the adequate level in the engine cooling circuit, it is possible to raise the temperature to the adequate level.

Further, in the aspect, the temperature of the electric storage device cannot be further reduced by the supply of the low-temperature first coolant to the electric storage device.

Therefore, good warm-up efficiency of the electric storage device is obtained.

In the hybrid construction machine, it is preferred that the equipment cooling circuit have a heat exchanger for cooling the second coolant; the equipment that needs cooling be provided in plurality in the equipment cooling circuit; and the plurality of units of the equipment that needs cooling be arranged in ascending order of upper limit value of the appropriate temperature thereof, from an outlet side of the heat exchanger.

In this aspect, the cooling medium from the heat exchanger flows from the equipment with a low upper limit value of the appropriate temperature to the equipment with a high upper limit value of the appropriate temperature. Therefore, the equipment units that need cooling can be cooled with good efficiency to the appropriate temperatures and the equipment units that need cooling can be maintained at the appropriate temperatures.

In the hybrid construction machine, it is preferred that the electric storage device temperature adjustment circuit have a urea water tank constituting an exhaust gas purification system of the engine.

In this aspect, when urea water is used for enhancing the purification of the exhaust gas, the circuit configuration is simplified, thereby making it possible to reduce the cost. More specifically, in the conventional configuration, the urea water is prevented from freezing by heating the urea water by introducing the first coolant into the urea water tank. Accordingly, in the aspect, since the urea water tank is provided in the electric storage device temperature adjustment circuit, it is not necessary to provide a separate heating circuit for the urea water tank. As a result, the circuit configuration is simplified and the cost can be reduced.

Further, the appropriate temperature (for example 10° C. to 40° C.) of the electric storage device is within a range of the appropriate temperature (for example, 0° C. to 40° C.) of urea water. Therefore, by adjusting the electric storage device 6 to the appropriate temperature, it is also possible to adjust the urea water to the appropriate temperature. In other words, no separate control is needed to be performed for adjusting the temperature of urea water, and the electric storage device and urea water can be maintained at the appropriate temperatures by performing switching control of the above-described engine cooling circuit, equipment cooling circuit, and lead-out switching valve. Therefore, the control for maintaining the urea water temperature is facilitated.

Industrial Applicability

In accordance with the present invention, the circuit configuration for maintaining the engine, electric storage device, and equipment that needs cooling at appropriate temperatures can be simplified and reduced in size.

Explanation of Reference Numerals

A electric storage device warm-up position
B electric storage device non-warm-up position
C equipment-side lead-out position
D engine-side lead-out position
E electric storage device cooling position
F electric storage device non-cooling position
1 engine
2 generator-motor (equipment that needs cooling)
6 electric storage device
7 slewing motor (equipment that needs cooling)
8 first inverter (equipment that needs cooling)
9 second inverter (equipment that needs cooling)
11 engine cooling circuit
12 equipment cooling circuit
13 electric storage device temperature adjustment circuit
14 cooling pump
15 sub-radiator (heat exchanger)
16 urea water tank
17 controller (control means)
18 warm-up switching valve
19 lead-out switching valve
20 electric storage device temperature sensor
21 water temperature sensor
22 equipment-side bypass circuit
23 cooling switching valve
24 motor temperature sensor (equipment temperature sensor)
30 engine-side bypass circuit

The invention claimed is:

1. A hybrid construction machine comprising:
an engine as a power source;
an electric storage device that is set to an appropriate temperature lower than an appropriate temperature of the engine;
equipment that needs cooling, including a motor and a controller therefor, and set to an appropriate temperature lower than the appropriate temperature of the electric storage device;
an electric storage device temperature adjustment circuit for maintaining the electric storage device at the appropriate temperature;
an engine cooling circuit cooling the engine with a first coolant;
a warm-up switching valve that is provided in the engine cooling circuit and capable of switching between an electric storage device warm-up position in which the first coolant after cooling the engine is introduced into the electric storage device temperature adjustment circuit and an electric storage device non-warm-up position in which the introduction of the first coolant into the electric storage device temperature adjustment circuit is stopped;
an equipment cooling circuit that cools, with a second coolant, the equipment that needs cooling, and that is capable of switching between a state in which the second coolant is introduced into the electric storage device temperature adjustment circuit and a state in which the introduction of the second coolant into the electric storage device temperature adjustment circuit is stopped;
a lead-out switching valve that is capable of switching between an engine-side lead-out position in which the first coolant located inside the electric storage device temperature adjustment circuit is led out to the engine cooling circuit, and an equipment-side lead-out position in which the second coolant located inside the electric storage device temperature adjustment circuit is led out to the equipment cooling circuit;

an electric storage device temperature sensor detecting the temperature of the electric storage device; and control means for controlling operation of the warm-up switching valve, the equipment cooling circuit, and the lead-out switching valve in such a manner that the second coolant or the first coolant after cooling the engine selectively flows inside the electric storage device temperature adjustment circuit, according to whether the electric storage device needs to be warmed up or cooled, which is determined on the basis of the temperature of the electric storage device detected by the electric storage device temperature sensor.

2. The hybrid construction machine according to claim 1, wherein the equipment cooling circuit has a cooling pump capable of switching between an actuated state in which the second coolant is introduced into the electric storage device temperature adjustment circuit and a non-actuated state in which the introduction of the second coolant into the electric storage device temperature adjustment circuit is stopped, and the control means:

(A) sets the warm-up switching valve to the electric storage device warm-up position, sets the cooling pump to the non-actuated state, and sets the lead-out switching valve to the engine-side lead-out position in a state in which the electric storage device needs to be warmed up; and (B) sets the cooling pump to the actuated state, sets the warm-up switching valve to the electric storage device non-warm-up position, and sets the lead-out switching valve to the equipment-side lead-out position in a state in which the electric storage device needs cooling.

3. The hybrid construction machine according to claim 1, wherein the equipment cooling circuit has a cooling switching valve capable of switching between an electric storage device cooling position in which the second coolant is introduced into the electric storage device temperature adjustment circuit and an electric storage device non-cooling position in which the introduction of the second coolant into the electric storage device temperature adjustment circuit is stopped, and the control means:

(A) sets the warm-up switching valve to the electric storage device warm-up position, sets the cooling switching valve to the electric storage device non-cooling position, and sets the lead-out switching valve to the engine-side lead-out position in a state in which the electric storage device needs to be warmed up; and (B) sets the cooling switching valve to the electric storage device cooling position, sets the warm-up switching valve to the electric storage device non-warm-up position, and sets the lead-out switching valve to the equipment-side lead-out position in a state in which the electric storage device needs cooling.

4. The hybrid construction machine according to claim 3, wherein the equipment cooling circuit has an equipment-side bypass circuit for circulating the second coolant only in the equipment cooling circuit, without passing the second coolant through the electric storage device temperature adjustment circuit, and the cooling switching valve supplies the second coolant to the electric storage device temperature adjustment circuit in the electric storage device cooling position, and supplies the second coolant to the equipment-side bypass circuit in the electric storage device non-cooling position.

5. The hybrid construction machine according to claim 4, further comprising an equipment temperature sensor that detects a temperature of the equipment that needs cooling, and supplies the detected temperature to the control means, wherein the equipment cooling circuit has a cooling pump capable of switching between an actuated state in which the second coolant is supplied to the cooling switching valve and a non-actuated state in which the supply of the second coolant to the cooling switching valve is stopped, and the control means sets the cooling switching valve to the electric storage device non-cooling position and actuates the cooling pump so that the warming up of the electric storage device and cooling of the equipment that needs cooling are performed in parallel when it is determined that the electric storage device needs to be warmed up and cooling of the equipment that needs cooling is required on the basis of the temperature of the electric storage device and the temperature of the equipment that needs cooling that are detected by the electric storage device temperature sensor and the equipment temperature sensor, respectively.

6. The hybrid construction machine according to claim 1, wherein the engine cooling circuit has an engine-side bypass circuit that circulates the first coolant only in the engine cooling circuit, without passing the first coolant through the electric storage device temperature adjustment circuit, and the warm-up switching valve supplies the first coolant to the electric storage device temperature adjustment circuit in the electric storage device warm-up position, and supplies the first coolant to the engine-side bypass circuit in the electric storage device non-warm-up position.

7. The hybrid construction machine according to claim 1, further comprising a water temperature sensor detecting a temperature of the first coolant, wherein the control means determines that the electric storage device needs to be warmed up when the temperature of the electric storage device is lower than a preset temperature and the temperature of the first coolant detected by the water temperature sensor is higher than a preset temperature.

8. The hybrid construction machine according to claim 1, wherein the equipment cooling circuit has a heat exchanger for cooling the second coolant, the equipment that needs cooling is provided in plurality in the equipment cooling circuit, and the plurality of units of the equipment that needs cooling is arranged in ascending order of upper limit value of the appropriate temperature thereof, from an outlet side of the heat exchanger.

9. The hybrid construction machine according to claim 1, wherein the electric storage device temperature adjustment circuit has a urea water tank constituting an exhaust gas purification system of the engine.

* * * * *